(12) United States Patent
Nath et al.

(10) Patent No.: US 8,874,704 B2
(45) Date of Patent: Oct. 28, 2014

(54) SEMI-AUTOMATIC DISCOVERY AND GENERATION OF USEFUL SERVICE BLUEPRINTS

(75) Inventors: Manikantan N. Nath, Pune (IN); Komal K. Shah, Pune (IN); Abhijit Sharma, Pune (IN)

(73) Assignee: BMC Software, Inc., Houston, TX (US)

( * ) Notice: Subject to any disclaimer, the term of this patent is extended or adjusted under 35 U.S.C. 154(b) by 146 days.

(21) Appl. No.: 13/546,765

(22) Filed: Jul. 11, 2012

(65) Prior Publication Data

US 2014/0019597 A1 Jan. 16, 2014

(51) Int. Cl.
*G06F 15/16* (2006.01)
(52) U.S. Cl.
USPC .......................... 709/220; 709/223; 709/224
(58) Field of Classification Search
USPC ........................................ 709/220, 223, 224
See application file for complete search history.

(56) References Cited

U.S. PATENT DOCUMENTS

| | | | | |
|---|---|---|---|---|
| 6,405,251 B1 * | 6/2002 | Bullard et al. | ................ | 709/224 |
| 2010/0191555 A1 * | 7/2010 | Shmul | ................ | 705/7 |
| 2012/0198073 A1 * | 8/2012 | Srikanth et al. | ................ | 709/226 |
| 2012/0297061 A1 * | 11/2012 | Pedigo et al. | ................ | 709/224 |
| 2013/0151674 A1 * | 6/2013 | Weeks | ................ | 709/220 |

OTHER PUBLICATIONS

"Apriori Algorithm", Wikipedia, retrieved on Jun. 17, 2012, pp. 1-4. Available at: http://en.wikipedia.org/wiki/Apriori_algorithm.

* cited by examiner

*Primary Examiner* — Nicholas Taylor
(74) *Attorney, Agent, or Firm* — Brake Hughes Bellermann LLP

(57) ABSTRACT

According to one general aspect, a method of semi-automatically discovering and generating useful service blueprints may include collecting, by an apparatus, a plurality of configuration information sets regarding a plurality of network service applications. The method may also include converting, by the apparatus, the plurality of configuration information sets into one or more normalized application instance graphs. The method may further include generating, by the apparatus, one or more application blueprint files based, at least in part, upon the one or more normalized application instance graphs.

18 Claims, 10 Drawing Sheets

100

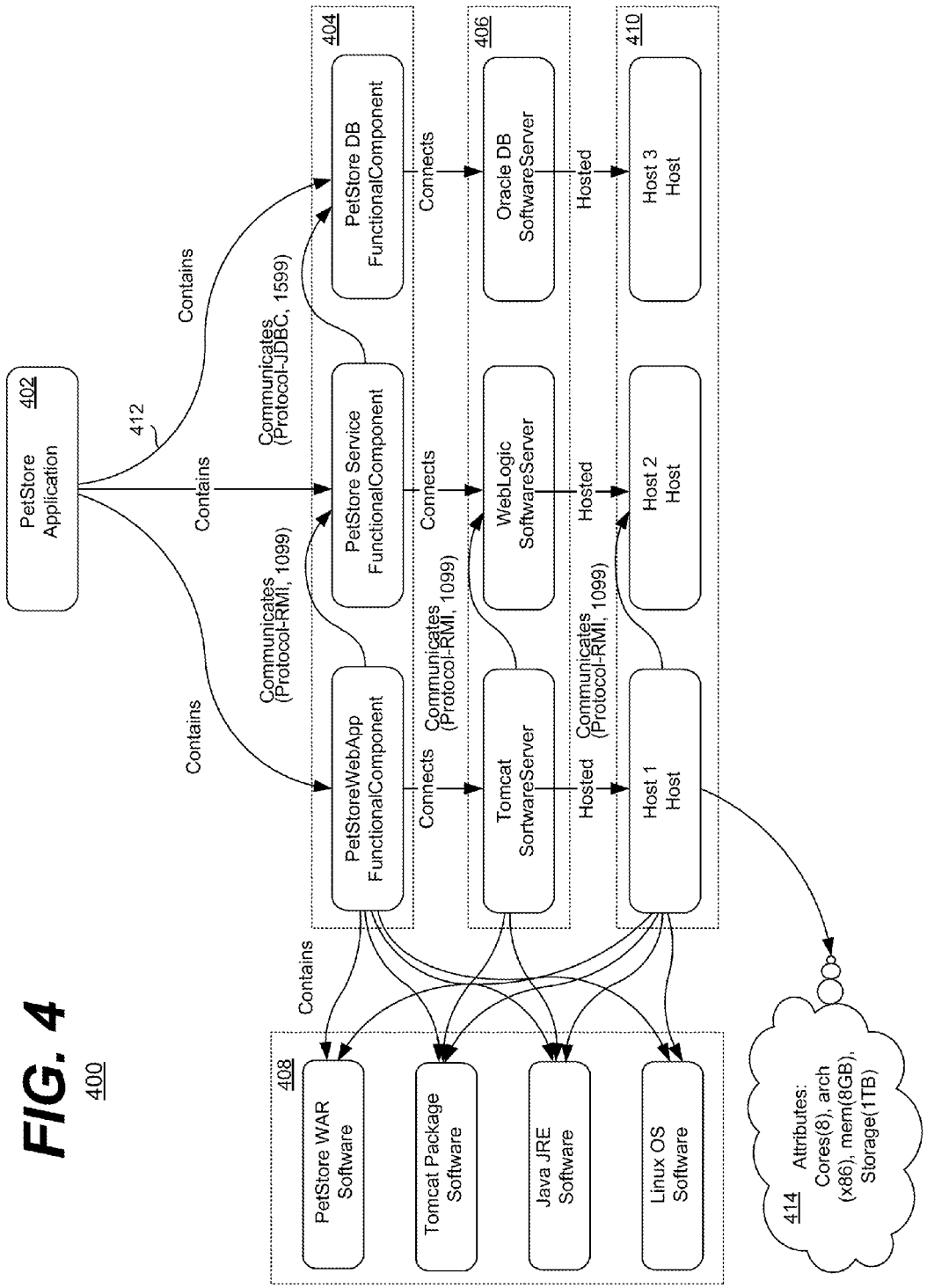

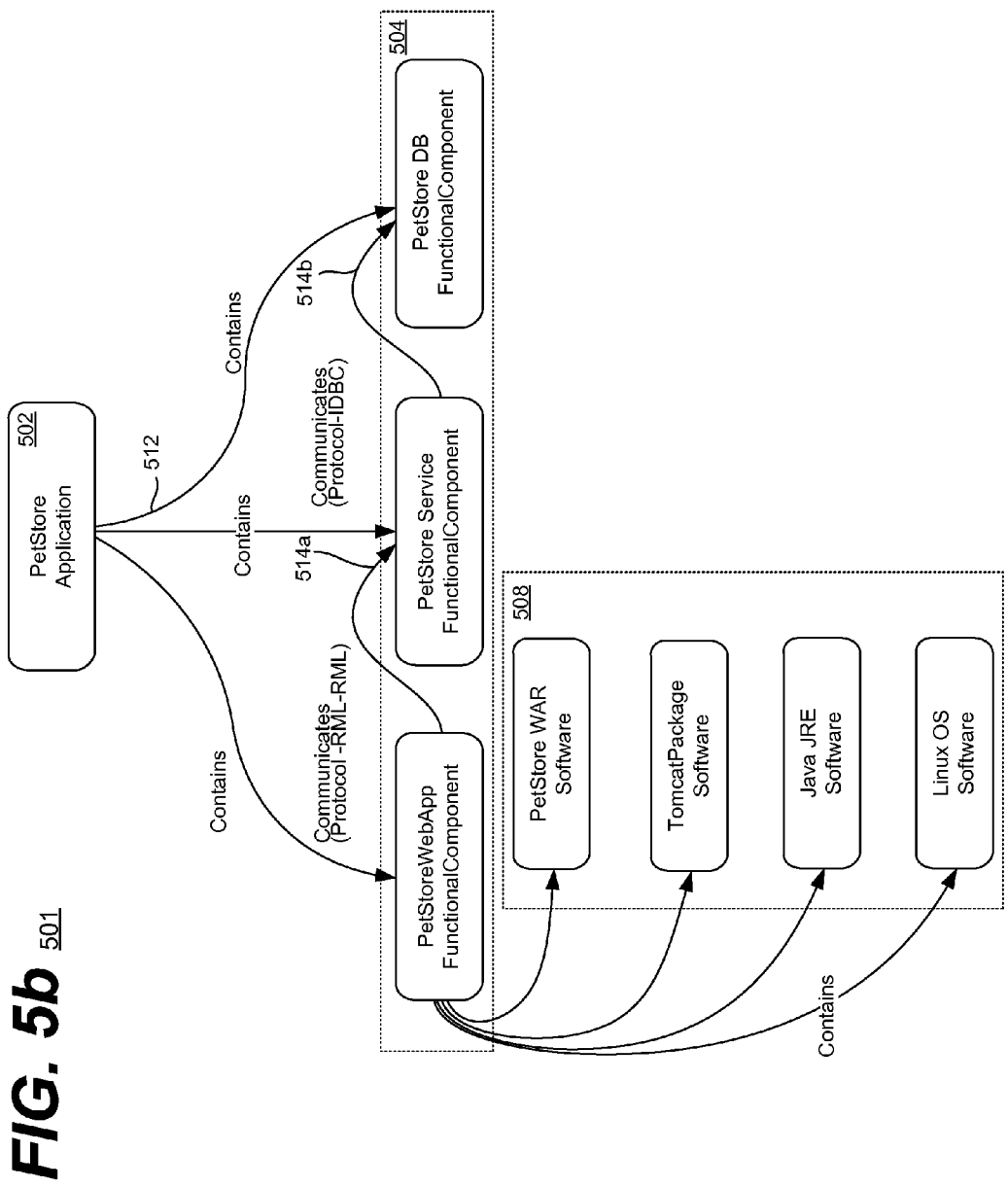

FIG. 6
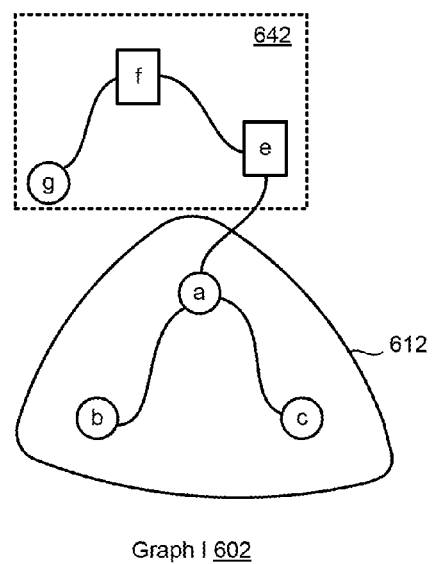
Graph I 602
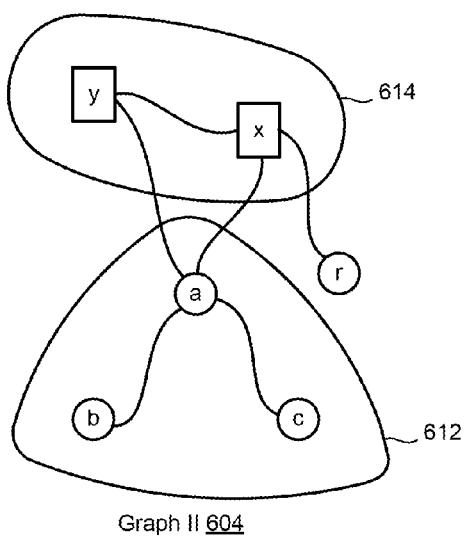
Graph II 604
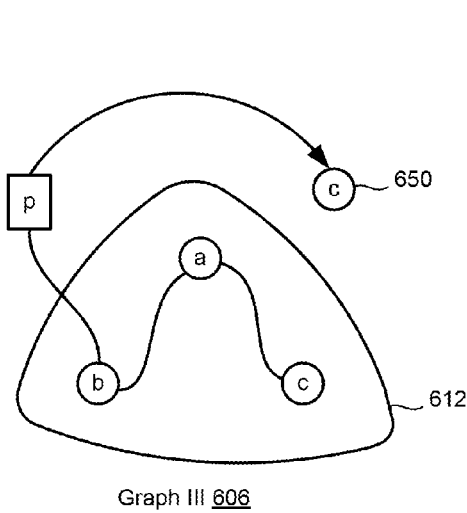
Graph III 606
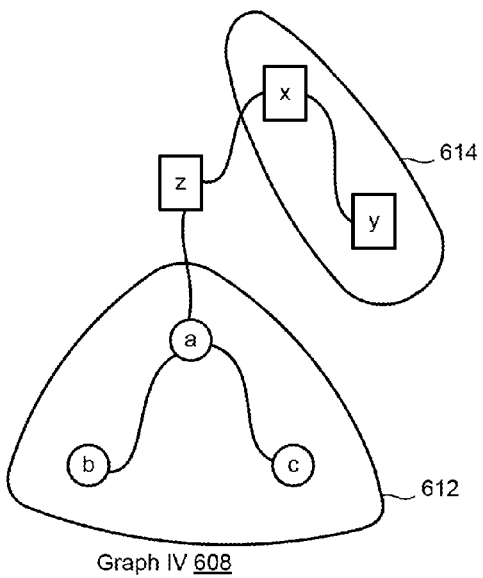
Graph IV 608

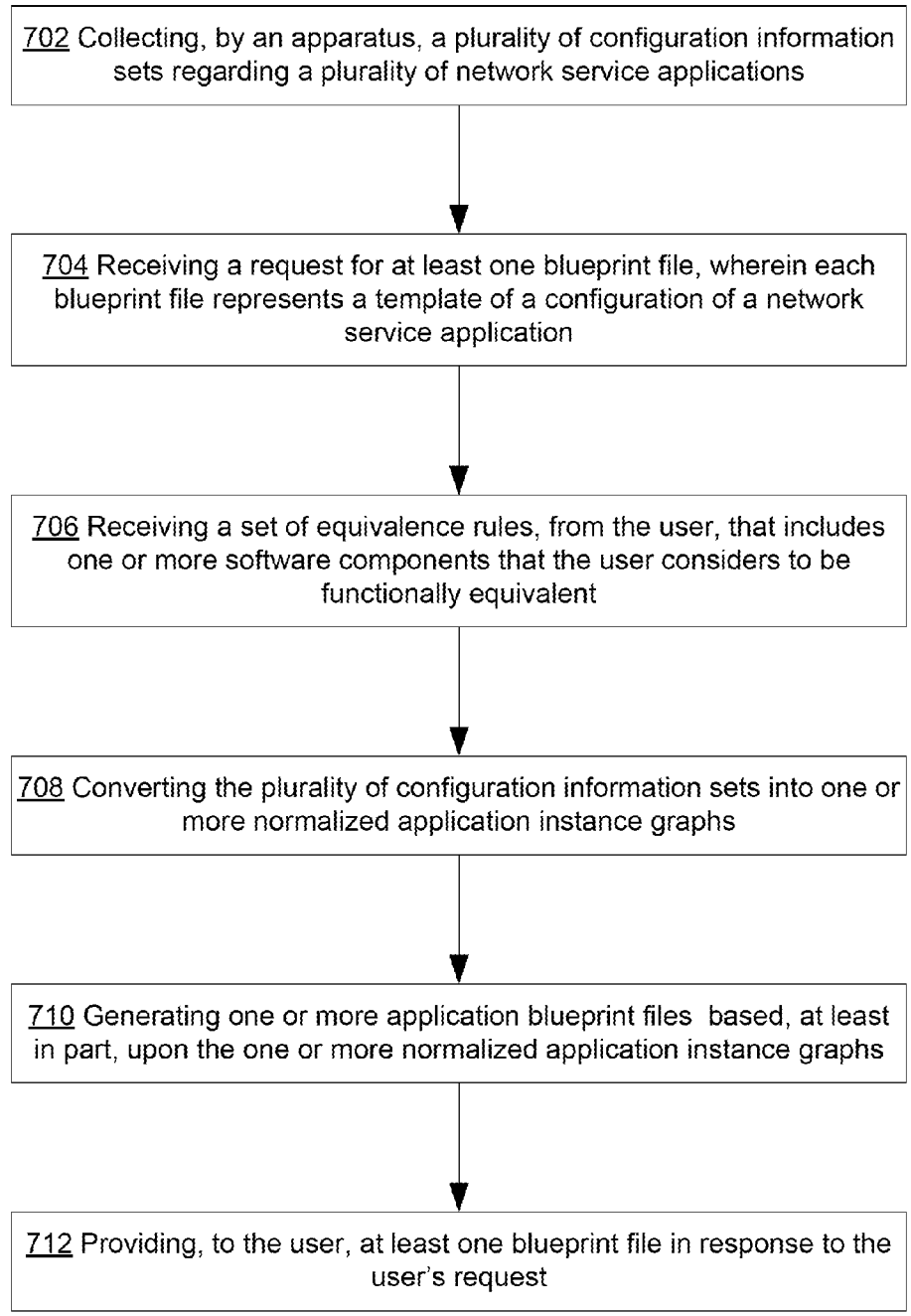

US 8,874,704 B2

SEMI-AUTOMATIC DISCOVERY AND GENERATION OF USEFUL SERVICE BLUEPRINTS

TECHNICAL FIELD

This description relates to the provisioning of computer services and applications, and more specifically to the generation and discovery of templates for computer services.

BACKGROUND

Setting up and configuring (or provisioning) a computer or network service (e.g. a web site, a web service, etc.) can be fairly difficult. Generally a computer or network service administrator must decide: what service is to be provided, what operating system or operating environment (e.g., Windows, Linux, .Net, Java, Perl, PHP (PHP: Hypertext Preprocessor), etc.), what frameworks or support applications will provide the structure of the service (e.g., Internet Information Services (IIS), Apache, MySQL (My Structured Query Language), etc.), what hardware is to be used, etc. In addition the decided or selected components frequently need to be configured.

In some cases, an administrator may find it useful or convenient to see what someone else in a similar situation selected or decided. These computer or network service configurations may be represented in a service template or blueprint, as described below.

SUMMARY

According to one general aspect, a method of semi-automatically discovering and generating useful service blueprints may include collecting, by an apparatus, a plurality of configuration information sets regarding a plurality of network service applications. The method may also include converting, by the apparatus, the plurality of configuration information sets into one or more normalized application instance graphs. The method may further include generating, by the apparatus, one or more application blueprint files based, at least in part, upon the one or more normalized application instance graphs.

According to another general aspect, an apparatus may include a memory and a processor. The memory may be configured to store a plurality of configuration information sets regarding a plurality of network service applications. The processor may be configured to convert the plurality of configuration information sets into one or more normalized application instance graphs, and generate one or more application blueprint files based, at least in part, upon the one or more normalized application instance graphs.

According to another general aspect, a computer program product for semi-automatically generating a blueprint file may be tangibly and non-transitorily embodied on a computer-readable medium. The computer program product may include executable code that, when executed, is configured to cause a data processing apparatus to collect a plurality of configuration information sets regarding a plurality of network service applications. The executable code may further convert the plurality of configuration information sets into one or more normalized application instance graphs. The executable code may further generate one or more application blueprint files based, at least in part, upon the one or more normalized application instance graphs.

The details of one or more implementations are set forth in the accompanying drawings and the description below. Other features will be apparent from the description and drawings, and from the claims.

A system and/or method for the provisioning of computer services and applications, substantially as shown in and/or described in connection with at least one of the figures, as set forth more completely in the claims.

BRIEF DESCRIPTION OF THE DRAWINGS

FIG. 4 is a block diagram of an example embodiment of a graph in accordance with the disclosed subject matter.

FIG. 5b is a block diagram of an example embodiment of a graph in accordance with the disclosed subject matter.

FIG. 6 is a block diagram of an example embodiment of a number of graphs in accordance with the disclosed subject matter.

FIG. 7 is a flowchart of an example embodiment of a technique in accordance with the disclosed subject matter.

Like reference symbols in the various drawings indicate like elements.

DETAILED DESCRIPTION

Figure 1:
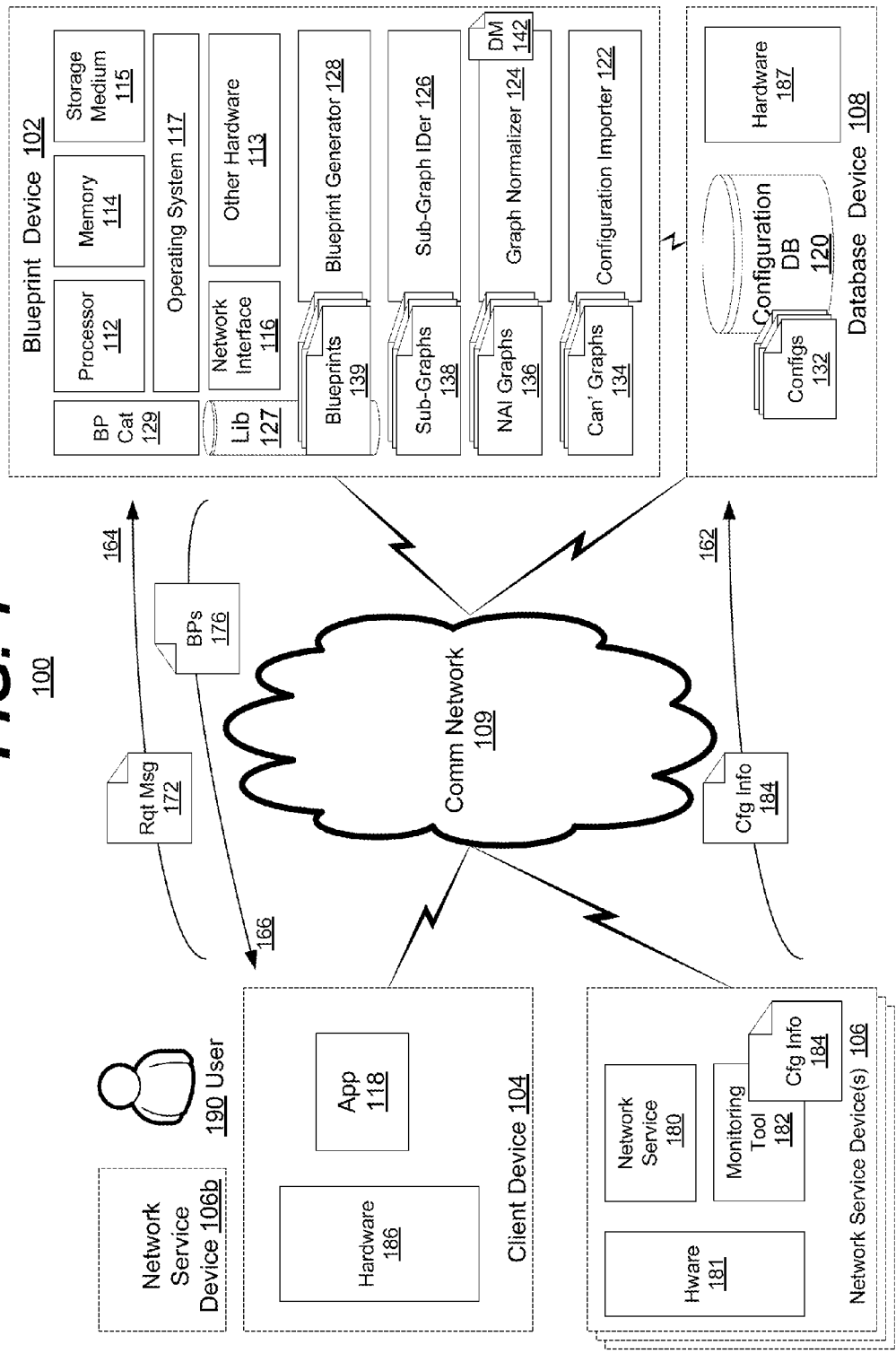
FIG. 1 is a block diagram of an example embodiment of a system in accordance with the disclosed subject matter.

FIG. 1 is a block diagram of an example embodiment of a system 100 in accordance with the disclosed subject matter.

In one embodiment, the system 100 may include a blueprint device 102. In one embodiment, the system 100 may also include one or more network service devices 106. However, in some embodiments, the system 100 may also include client computing device 104 and/or a user 190, and a database device 108. In various embodiments, these devices 102, 104, 106, and 108 may communicatively coupled via communications network 109 (e.g., the Internet, an intranet, etc.).

In various embodiments, the blueprint device 102, the client device 104, the network service device(s) 106 and/or the database device 108 may each include a computing device, such as, for example, one or more server computing devices. However, in various embodiments, the blueprint device 102 may include a server, a blade server, a desktop personal computer, a laptop, etc. or a virtual machine or appliance thereof.

In various embodiments, the blueprint device 102 may include a processor 112 configured to execute one or more machine executable instructions or pieces of software, firmware, or a combination thereof. The blueprint device 102 may include, in some embodiments, a memory 114 configured to store on or more pieces of data, either temporarily, permanently, semi-permanently, or a combination thereof. Further, the memory 114 may include volatile memory, non-volatile memory or a combination thereof. In various embodiments, the blueprint device 102 may include a storage medium 115 configured to store data in a semi-permanent or substantially permanent form. In various embodiments, the storage medium 115 may be included by the memory 114.

In various embodiments, the blueprint device 102 may include one or more network interfaces 116 configured to allow the blueprint device 102 to be part of and communicate via a communications network 108. Examples of a Wi-Fi protocol may include, but are not limited to: Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to: IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

In various embodiments, the blueprint device 102 may include one or more other hardware components 113 (e.g., a display or monitor, a keyboard, a touchscreen, a camera, a fingerprint reader, a video processor, etc.). It is understood that the above are merely a few illustrative examples to which the disclosed subject matter is not limited.

In various embodiments, the blueprint device 102 may include an operating system (OS) 117 configured to provide one or more services to an application (e.g., configuration importer 122, etc.) and manage or act as an intermediary between the application and the various hardware components (e.g., the processor 112, a network interface 116, etc.) of the blueprint device 102. In such an embodiment, the blueprint device 102 may include one or more native applications, which may be installed locally (e.g., within the storage medium 115, etc.) and configured to be executed directly by the processor 112 and directly interact with the OS 117.

In various embodiments, the system 100 may include or be in communication with one or more client devices 104. In some embodiments, the client device 104 may be used by a user 190. However, in various embodiments, the client device 104 may include a desktop personal computer, a laptop, a tablet, a smartphone, a thin-client, etc. or a virtual machine or appliance thereof.

In various embodiments, the user 190 may be an administrator of a network or computing service device 106b. In various embodiments, network or computing service device 106b may be similar to one of the network service devices 106, as described below.

In such an embodiment, the client device 104 may include various hardware components 186 analogous to those described in relation to the blueprint device 102, as described above. In one embodiment, the client device 104 may include or may execute an application 118. In such an embodiment, the application 118 may include pre-compiled machine executable code. In some embodiments, the application 118 may include a script interpreter (e.g., C shell (csh), AppleScript, AutoHotkey, etc.) or a virtual machine (e.g., the Java Virtual Machine, the Microsoft Common Language Runtime, etc.) that are configured to translate source or object code into executable code which is then executed by a processor (included by hardware 186). It is understood that the above are merely a few illustrative examples to which the disclosed subject matter is not limited. In a specific embodiment, the application 118 may include a web browser.

In the illustrated embodiment, the user 190 may desire to find one or more blueprints or templates in order to provision the network service device 106b. In order to fulfill this desire the user 190 may access, via the application 118, the blueprint device 102. The user 190 may send a request message 172 to the blueprint device 102. As described in more detail below, the request message 172 or series of request messages 172 may include the type of network service the user 190 wishes to setup and any restrictions the user 190 is laboring under or desires (e.g., the type of hardware included by network service device 106b, a software limitation, etc.).

In response to the request message 172, the blueprint device 102 may return or transmit to the client device 104 one or more blueprints or templates 176. As described below, each of these blueprints or templates 176 may include a specification or other information that provides a user 190 with an example of a system (e.g., hardware software, configuration values, etc.) that may be used to setup or provision the network service device 106b.

Figure 2A:
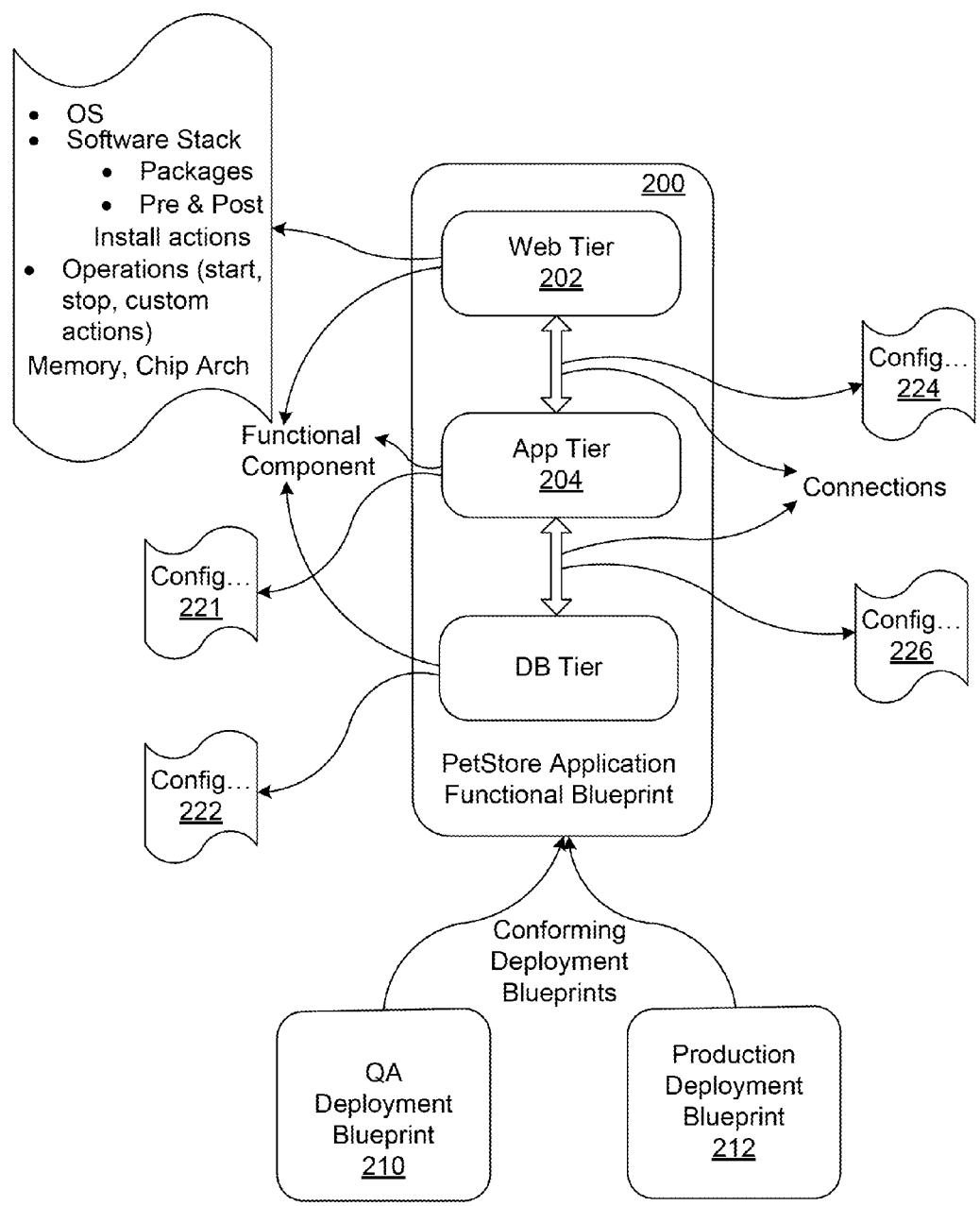
FIG. 2a is a block diagram of an example embodiment of a number of blueprints in accordance with the disclosed subject matter.

FIG. 2a is a block diagram of an example embodiment of blueprints 200, 210, and 212 in accordance with the disclosed subject matter. In the illustrated embodiment, the blueprint 200 includes a functional blueprint for a pet store 3-tier application with various connections and configurations. It is understood that the above is merely one illustrative example to which the disclosed subject matter is not limited.

In some embodiments, blueprints (e.g., blueprint 200) represent re-useable canonical application templates which represent different application views. These blueprints are typically stored in a repository and made available, as part of a catalog (e.g., blueprint catalog 129 and repository 127 of FIG. 1, etc.), for users to select from for various purposes like provisioning etc., as described above. In various embodiments, enterprise and application architects in collaboration with middleware, database, OS administrator's etc. may define these blueprints based on enterprise architecture standards, reference architectures, security standards, stable versions, standards compliance, performance characteristics etc. However, in the illustrated embodiments, the blueprint 200 may be semi-automatically generated via a blueprint device (e.g., blueprint device 102 of FIG. 1, etc.).

In various embodiments, a blueprint may include a declarative specification of different aspects or views of an application or network service like the architecture view and the deployment view. In such an embodiment, the blueprint may be used for enabling various key application related cloud and other use cases. For example in one such embodiment, a Cloud Life Management (CLM) system may use a blueprint to perform automated provisioning of applications or network services in the cloud. In other embodiments, a blueprint may be used to automatically configure, monitor, and/or test compliance etc. for an application or network service. It is understood that the above are merely a few illustrative examples to which the disclosed subject matter is not limited.

In the illustrated embodiment, a blueprint may take one of at least two forms, functional or deployment. It is understood that the above are merely a few illustrative examples to which the disclosed subject matter is not limited.

In one embodiment, a Functional Blueprint (e.g., blueprint 200, etc.) of an application or network service may define the topology (number of tiers), configuration, actions, constraints, operating systems, and/or software packages that need to be provisioned to "stand up" or install an application or network service. In various embodiments, the functional blueprint may define the architectural view or the structure of an application or network service in terms of its tiers or functional components and the connections between them. In one embodiment, the functional blueprint 200 may also define the software stack and related artifacts like startup, install scripts, etc. within each functional component.

In the illustrated embodiment, the PetStore example is used once again. However, it is understood that the above is merely one illustrative example to which the disclosed subject matter is not limited.

A functional blueprint 200 for the "PetStore" e-commerce 3-tier application may include three tiers or functional components: a web tier 202, an application tier 204, and a database (DB) tier 206. These tiers are described in more detail in regards to FIG. 2b below. In the illustrated embodiment, the functional blueprint 200 may include or indicate the relevant connections between these tiers and the software stack defined on each.

A functional blueprint 200 for the "PetStore" e-commerce 3-tier application may include one or more pieces or sets of information detailing the configuration of the various tiers. For example, the DB tier 206 may be associated with configuration information 222, the application tier 204 may be associated with the configuration information 221, and the web tier 202 may be associated with the configuration information 220. In the illustrated embodiment, the configuration information 220 may indicate the software that includes the web tier (e.g., software packages, pre and post installation actions, operations or scripts executed with the web tier, and minimum hardware requirements, etc.).

Likewise, the functional blueprint 200 may include one or more configuration files or information sets 224 and 226 regarding the connections or interactions between the tiers (e.g., between the web tier 202 and the application tier 204, etc.). In such an embodiment, the configuration information 224 may include, for example, the port settings, communication protocol information (Extensible Markup Language (XML), JavaScript Object Notation (JSON), Simple Object Access Protocol (SOAP), and/or a Representational state transfer (REST)-ful web service, Common Object Request Broker Architecture (CORBA), Distributed System Object Model (DSOM), Distributed Component Object Mode (DCOM), Remote Procedure Calls (RPC), and/or an Application Programming Interface (API) provided by the network service, etc.), etc. It is understood that the above are merely a few illustrative examples to which the disclosed subject matter is not limited.

In one embodiment, a Deployment Blueprint (e.g., blueprints 210 and 212, etc.) may define a way (amongst many) in which the application or network service may be provisioned in terms of mapping the functions of the functional blueprint 200 to system resources. In one embodiment, a deployment blueprint may define the deployment view or intent for an application or network service in terms of resource requirements (e.g., computer, storage, network, etc.) for deploying the application or network service's various functional components. In such an embodiment, a deployment blueprint may dictate to specify exactly what type of hardware or other system resources are dedicated to a given application or network service.

In various embodiments, multiple deployment blueprints may conform to a functional blueprint of an application or network service (e.g., functional blueprint 200, etc.). For example, the quality assurance (QA) deployment blueprint 210 may be configured to dictate the resource requirements for a deployment of the PetStore functional blueprint 200 for use in a QA setting. Conversely, the production deployment blueprint 212 may dictate the resource requirements for a deployment of the PetStore functional blueprint 200 for use as an actual retail web store used by customers.

In one embodiment, the deployment blueprint 210 for quality assurance (QA) deployment for the "PetStore" e-commerce 3-tier application may define deploying all 3 functional components (web tier 202, application tier 204 and database tier 206) via a single virtual machine (VM) with certain processor, memory resources, etc. In another embodiment, the deployment blueprint 212 for a production deployment of "PetStore" may define deploying each of the 3 functional tiers on 3 individual VM's with specified CPU, Memory resources. It is understood that the above are merely a few illustrative examples to which the disclosed subject matter is not limited.

Figure 2B:
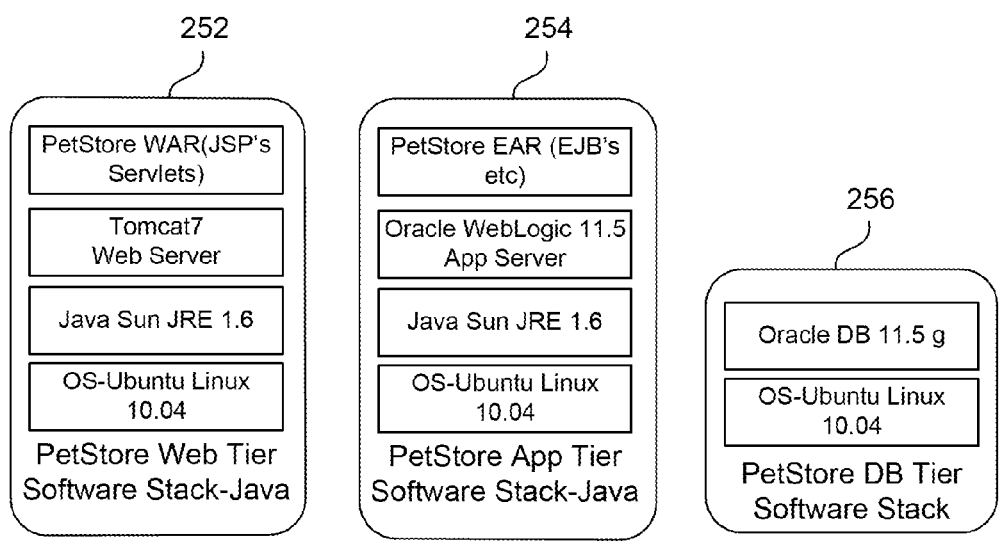
FIG. 2b is a block diagram of an example embodiment of a number of blueprint portions in accordance with the disclosed subject matter.

FIG. 2b is a block diagram of an example embodiment of a number of portions 252, 254, and 256 of a blueprint 200 in accordance with the disclosed subject matter. As described above, the blueprint 200 includes a functional blueprint for a pet store 3-tier application with various tiers: a web tier 202, an application tier 204, and a database (DB) tier 206. It is understood that the above is merely one illustrative example to which the disclosed subject matter is not limited.

In various embodiments, these partial blueprints or blueprint portions may include stack element(s) and/or tier definitions which can be assembled together. In such an embodiment, these re-usable and compose-able partial blueprints for software packages or stack elements (e.g., Java JRE, application server Oracle WebLogic 11.5, etc.) and for functional components, etc. These "micro-blueprints" or blueprint portions may be combined, in various embodiments, together to assemble a complete application or functional component blueprint.

In the illustrated embodiment, the blueprint portion 252 may indicate that the web tier 202 includes one or more pieces of software. In a specific embodiment, the web tier 202 may make use of the Java software stack or execution environment and include the following software components: PetStore Web Application Archive (WAR) files for JavaServer Pages (JSP), the Tomcat 7 web server, Ubuntu Linux 10.04 as the Operating System, and Java Sun JRE 1.6 as the platform runtime installed on the OS. In some embodiments, the web tier 202 may include information on the dependencies, connections and/or configurations between the stacked consecutive software components. or layers.

In the illustrated embodiment, the blueprint portion 254 may indicate that the application tier 204 includes one or more pieces of software. In a specific embodiment, the application tier 204 may make use of the Java software stack or execution environment and include the following software components: Ubuntu Linux 10.04 as the Operating System, the Java Sun JRE 1.6 as the platform runtime installed on the OS, the Oracle WebLogic 11.5 server as the Java compliant application server running on the JRE, and PetStore Enterprise Archive (EAR) files for Enterprise JavaBeans (EJB). In some embodiments, the application tier 204 may include information on the dependencies, connections and/or configurations between the stacked consecutive software components or layers.

In the illustrated embodiment, the blueprint portion 256 may indicate that the DB tier 206 includes one or more pieces of software. In a specific embodiment, the DB tier 206 may include the following software components: Ubuntu Linux 10.04 as the Operating System, and the Oracle Database 11.5 g server. In some embodiments, the DB tier 206 may include information on the dependencies, connections and/or configurations between the stacked consecutive software components or layers.

Returning to FIG. 1, the process of semi-automatically generating the blueprints 172 is described in more detail. Further, the process of providing or discovering various blueprints 172 may a user 190 is described in additional detail.

In one embodiment, the network service device 106 may provide or may execute a network service 180. In a specific embodiment, the network service 180 may include a web service. In various embodiments, the network service 180 may perform various functions, such as providing information, receiving information, or a combination thereof. Example, network services 180 may include providing a weather report, storing information (e.g., a database, a cloud data backup, etc.), currency conversion, database lookups (e.g., Customer relationship management data, inventory status, etc.), insurance quote, electronic payment or funds transfer, package shipment tracking, etc. It is understood that the above are merely a few illustrative examples to which the disclosed subject matter is not limited.

In various embodiments, the network service device 106 may include a monitoring tool 182. In such an embodiment, the monitoring tool 182 may be configured to monitor or analyze the network service 180 and generate a set of configuration information 184. In various embodiments, the configuration information 184 may include discovered information regarding the network service 180 that pertains to, for example, the network service topology, configuration, deployment (e.g., hosted resources, usage related data, etc.), or system resources (e.g., processor type, virtual machine information, etc.), etc. It is understood that the above are merely a few illustrative examples to which the disclosed subject matter is not limited.

In a specific embodiment, discovery products like BMC's Atrium Discovery and Dependency Mapping (ADDM) or other third party products, repositories like BMC's Configuration Management Database (CMDB) etc. may be used as sources 182 of application discovery and dependency data. In such an embodiment, the monitoring tools 182 may be configured to capture information about the network service or application 180, their components, inter-dependencies between components and applications, installed software, running software servers, their configuration, infrastructure resources in use (and their capacity) e.g. hosts etc.

In addition, application or service 180 usage data can be captured from various monitoring tool 184 sources such as BMC's Coradiant (End To End User Experience), BMC's Service Request Management (SRM) Catalog, BMC's ProactiveNet Performance Management Suite (BPPM), etc. It is understood that the above are merely a few illustrative examples to which the disclosed subject matter is not limited. In such an embodiment, the monitoring tool 184 may be configured to captures granular performance metrics data at the application, application component and related infrastructure level. This may reflect the degree of usage of applications and their specific components. This data may be, in various embodiments, leveraged by the blueprint device 102 to prune or modify application graph instances.

Figure 3A:
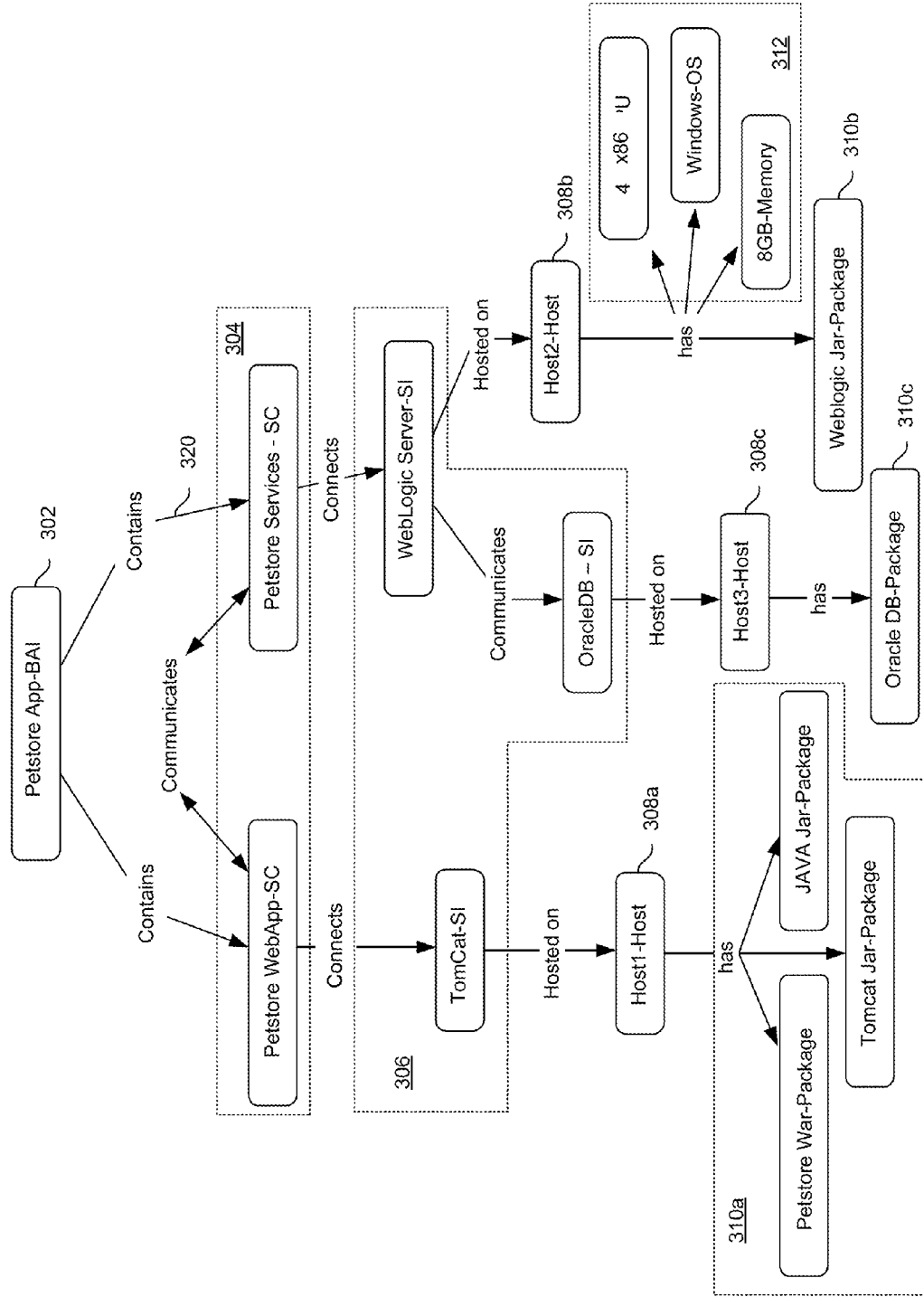
FIG. 3a is a block diagram of an example embodiment of a graph in accordance with the disclosed subject matter.

FIG. 3a is a block diagram of an example embodiment of a graph 300 in accordance with the disclosed subject matter. In the illustrated embodiment, an Atrium Discovery and Dependency Mapping (ADDM) generated graph or configuration information (e.g., configuration information 184 of FIG. 1, etc.) is shown for the specific example of the PetStore application or network service (e.g., network service 180 of FIG. 1). It is understood that the above is merely one illustrative example to which the disclosed subject matter is not limited.

In the illustrated embodiment, the graph 300 may be represented similarly to an object model diagram and may include a business application or service instance (BAI) node 302. In the illustrated embodiment, the PetStore BAI 302 may include or be connected to two software component (SC) nodes 304, the PetStore web application SC and the PetStore services SC. In various embodiments, the SC nodes 304 may represent an instance of a Software Component running inside a Software Instance, for example a deployed application inside a Java Enterprise (J2EE) application server. In the illustrated embodiment, the graph 300 may include a number of service instance (SI) nodes 306 that represents instances of off-the-shelf or substantially standardized or commoditized software products (e.g., a TomCat web server, a WebLogic server, am Oracle DB, etc.). It is understood that the above are merely a few illustrative examples to which the disclosed subject matter is not limited.

In various embodiments, the graph 300 may show or include the physical or virtual devices used to execute or host the various SI nodes 306. In turn the graph 300 may include or show the software or operating system environment included by the respective host computing devices. For example, the host 308a may have installed upon its the software environment 310a that includes the PetStore WAR, Java, and Tomcat software packages. The host 308b may include the may include or have the WebLogic software package within its the software environment 310b. The host 308c may include the Oracle DB software environment within its the software environment 310c.

In addition, in various embodiments, the graph 300 may include or display the system resources 312 of a given host. For example, the graph 300 may show that host 308b includes the following system resources: a four core x86 family or architecture processor, 8 gigabytes (GB) of random access memory (RAM), etc. In some embodiments, the OS may be included as part of the system resources 312, as shown. However, in another embodiment, the OS may be included as part of the software environment portion of graph 300 (e.g., software environment 301b). It is understood that the above are merely a few illustrative examples to which the disclosed subject matter is not limited.

In various embodiments, the graph 300 may include one or more links or relationships 320 between the nodes (e.g., node 302 and nodes 304, etc.). In such an embodiment, these links 320 may show that various nodes "contain", communicate with", "has", "includes", is "hosted on" by other nodes or other relationships. It is understood that the above are merely a few illustrative examples to which the disclosed subject matter is not limited. For example, host 308b includes the system resources 312 and the software environment 310b.

Figure 3B:
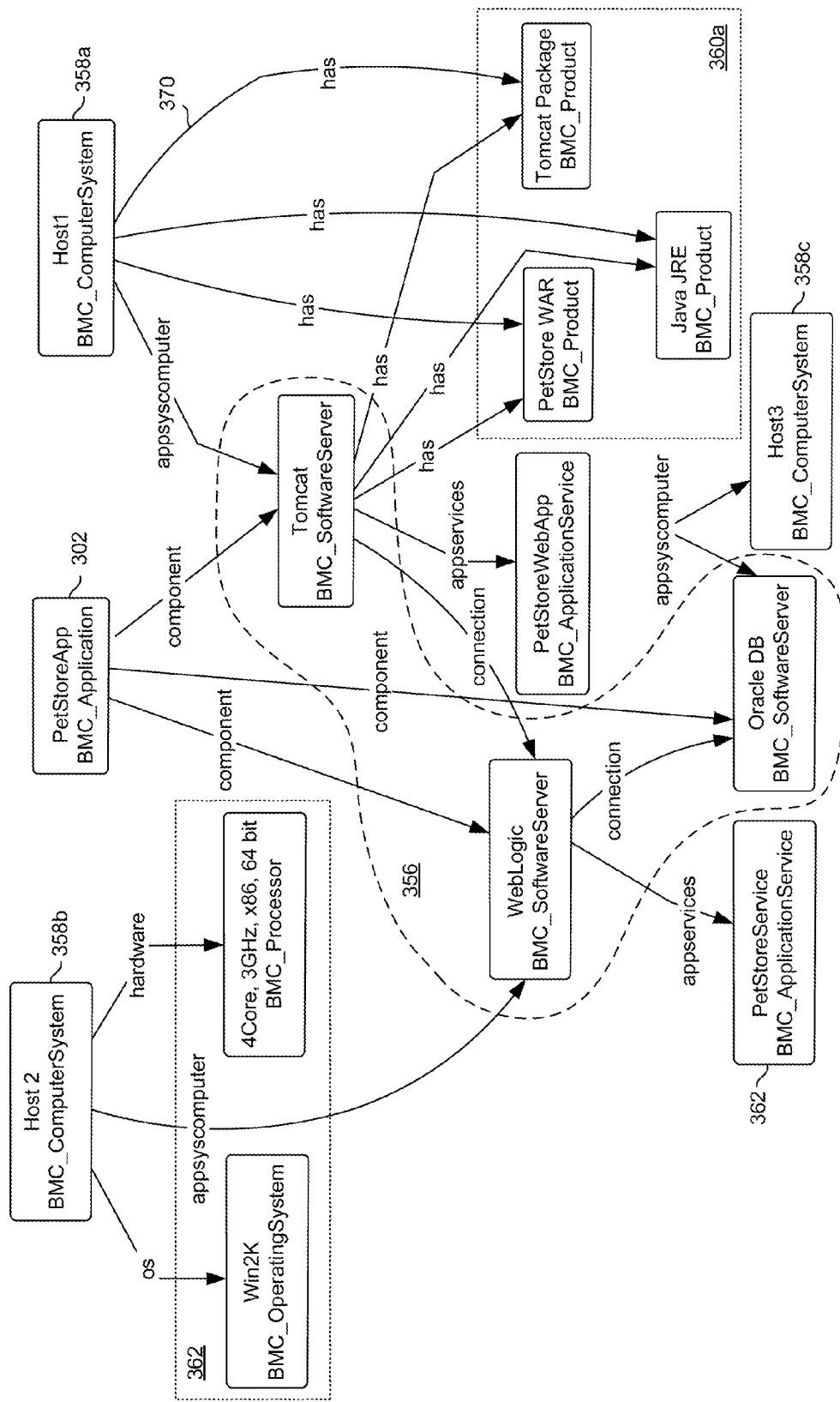
FIG. 3b is a block diagram of an example embodiment of a graph in accordance with the disclosed subject matter.

FIG. 3b is a block diagram of an example embodiment of a graph 301 in accordance with the disclosed subject matter. In the illustrated embodiment, a Configuration Management Database (CMDB) generated graph or configuration information (e.g., configuration information 184 of FIG. 1, etc.) is shown for the specific example of the PetStore application or network service (e.g., network service 180 of FIG. 1). In such an embodiment, the graph 301 may include similar but not identical information to the ADDM generated graph 300, as described above. It is understood that the above is merely one illustrative example to which the disclosed subject matter is not limited.

In the illustrated embodiment, the graph 301 may include an application or network service node 302 configured to represent an instance of a known business application running in the environment. In the illustrated embodiment, the graph 301 may include a number of software component nodes 356 configured to represent instances of Software Components that comprise the application or network service, as described above.

In addition, the graph 301 may display or include a number of software application, daemon, or service nodes 362 that represent various low-level or custom application or services provided by the SC nodes 356. In various embodiments, these nodes 362 may be similar to but not identical in meaning to the some of the software environment portions of graph 300 of FIG. 3a.

Likewise the graph 301 may include a number of physical or virtual devices (e.g., hosts 358a, 358b, and 358c, etc.) used to execute or host the various SC nodes 356. In turn the graph 301 may include or show the software or operating system environment included by the respective host computing devices. For example, the host 358a may have installed upon its the software environment 360a that includes the PetStore WAR, Java, and Tomcat software packages. In addition, in various embodiments, the graph 301 may include or display the system resources 362 of a given host (e.g., host 358a).

Returning to FIG. 1, the monitoring tool 102 may be configured to send or transmit the collected configuration information 184 to a database device 106 (illustrated by message 162).

In a specific embodiment, the database device 108 may include a server, blade server, desktop personal computer, a laptop, etc. or a virtual machine or appliance thereof. In such an embodiment, the database device 108 may include various hardware components 187 analogous to those described in relation to the blueprint device 102, as described above. In some embodiments, the database device 108 may be co-located with or even integrated with the blueprint device 102. In the illustrated embodiment, the database device 108 and blueprint device 102 may be separate entities.

In one embodiment, the client device 104 may include or may maintain configuration database 120 that stores a plurality of configuration information graphs or files 132 (e.g., graphs 300 and 3001 of FIGS. 3a and 3b, respectively, etc.). In various embodiments, these configuration information or graphs 132, or a number of them, may have been collected or received from various network service devices 106. In another embodiment, the configuration information or graphs 132 may have been manually or automatically loaded by a user (not shown) or other source (e.g., storage device, etc.). In various embodiments, the configuration information or graphs 132 may be heterogeneous and include a variety of formats. In yet another embodiment, the configuration information or graphs 132 may be homogeneous and be translated or normalized into a common format.

In the illustrated embodiment, the blueprint device 102 may include a configuration importer 122. In various embodiments, the configuration importer 122 may be configured to collect and import one or more prices of configuration information 132 from the database device 108.

In such an embodiment, the configuration importer 122 may be configured to map the discovered or imported configuration information 132 to canonical application or network service instance graphs 134. In various embodiments, the canonical application or network service instance graphs 134 may include a pre-defined format or protocol that may be processed by the blueprint device 102. In such an embodiment, an ADDM formatted graph (e.g., similar to graph 300 of FIG. 3a) and a CMDB formatted graph (e.g., similar to graph 301 of FIG. 3b) may be converted or mapped into a canonical graph (e.g., similar to graph 400 of FIG. 4). It is understood that the above are merely a few illustrative examples to which the disclosed subject matter is not limited.

In one embodiment, the canonical graph 134 representation of a network service may include a plurality of nodes (e.g., different classes, hosts, software programs, etc.) and the relationships between the nodes. In one embodiment, this canonical graph 134 may take the form of graph 400 of FIG. 4. It is understood that the above is merely one illustrative example to which the disclosed subject matter is not limited.

FIG. 4 is a block diagram of an example embodiment of a canonical graph 400 in accordance with the disclosed subject matter. In one embodiment, the graph 400 may have been created from an imported graph such as graph 300 of FIG. 3a or graph 301 of FIG. 3b, as described above. In the illustrated embodiment, a canonical graph 400 is shown for the specific example of the PetStore application or network service (e.g., network service 180 of FIG. 1). It is understood that the above is merely one illustrative example to which the disclosed subject matter is not limited.

In various embodiments, the canonical graph 400 may include an Application or Network Service node 402 that represents an instance of an application or network service running in the environment defined by the graph 400. In some embodiments, the application node 402 may include or be connected with a number of Functional Component nodes 404.

In various embodiments, the canonical graph 400 may include a number of Functional Component nodes 404. In such an embodiment, each Functional Component node may represent an instance of an application component representing a tier running inside a Software Server. In the illustrated embodiment, Functional Component nodes 404 may include a deployed application WAR, a deployed PetStore service, and a PetStore DB. It is understood that the above is merely one illustrative example to which the disclosed subject matter is not limited.

In various embodiments, the canonical graph 400 may include a number of Software Server nodes 406. In such an embodiment, each Software Server node may represent an instance of an application component representing an instance of a running application server (e.g. a J2EE server, etc.) that hosts at least one Functional Component. In the illustrated embodiment, Software Server nodes 406 may include a deployed Tomcat web server, a WebLogic server, and an Oracle database. It is understood that the above is merely one illustrative example to which the disclosed subject matter is not limited.

In various embodiments, the canonical graph 400 may include a number of Software nodes 408. In such an embodiment, each Software node may represent an instance of an off-the-shelf or substantially standardized or commoditized software product. In the illustrated embodiment, Software nodes 404 may include a Tomcat web server package, a PetStore WAR, a Java Runtime Environment (JRE), and a Linux and/or a Windows OS. It is understood that the above is merely one illustrative example to which the disclosed subject matter is not limited.

In various embodiments, the canonical graph 400 may include a number of Host nodes 410. In such an embodiment, each Host node may represent a computing resource or device which hosts the software servers (nodes 406). In the illustrated embodiment, three host nodes 410 may be used or employed. It is understood that the above is merely one illustrative example to which the disclosed subject matter is not limited.

In various embodiments, the canonical graph 400 may include a number of Relationships 412. In such an embodiment, each Relationship 412 may represent how various nodes are related to each other and the nature of that relationship (e.g., "contains", "includes", "depends upon", "hosted by", etc.). For example, in one embodiment, the Application node 402 may include the Functional Component nodes 404. It is understood that the above is merely one illustrative example to which the disclosed subject matter is not limited.

In various embodiments, the canonical graph 400 may include a number of Attributes 414. In such an embodiment, each Attribute 414 may be associated with a node (e.g., nodes 402, 404, 406, 408, or 410) or a relationship 412. In one embodiment, the Attributes 414 may be thought of or described as metadata associated with the node or relationship data. In various embodiments, for each node or relationship type may be associated with different forms of attributes 414. For example, in one embodiment, a software node 408 may be associated with attributes regarding the software's name, version, etc. In another embodiment, a host node 410 may be associated with attributes regarding the host's system resources (e.g., network name, number of processor cores, amount of memory, processor architecture, etc.). It is understood that the above are merely a few illustrative examples to which the disclosed subject matter is not limited.

Returning to FIG. 1, in various embodiments, two or more configuration graphs 132 for the same network service 180 may be encountered, such as graphs 300 and 301 of FIGS. 3a and 3b respectively. In such an embodiment, the configuration importer 122 may be configured to reconcile the discovered configuration information 132 in case of overlapping data sources are encountered.

In one embodiment, the configuration importer 122 may be configured to generate a canonical graph 134 for each imported configuration information 132 and then perform the reconciliation process. In such an embodiment, the reconciliation may result in a single canonical graph 134. In another embodiment, the reconciliation may occur before or as part of the generation of the final canonical graph 134.

In another embodiment, the reconciliation may occur by the configuration importer 122 selecting a selected imported configuration information 132 as a preferred or master configuration information 132 and by adding, removing, or altering elements or nodes and relationships from the master configuration information 132 based upon the other less-preferred configuration information sets 132.

In one embodiment, the selection of a master configuration information set 132 may be based on a pre-defined set of format preferences (e.g., an ADDM graph may be preferred over a CMDB graph, etc.), source preferences (e.g., graphs from network device A may be preferred over graphs from network device B, graphs loaded from a memory device may be preferred over graphs from a network device, etc.), or other criteria. In another embodiment, the selection of a master configuration information set 132 may be based on a dynamic set of criteria. For example, configuration importer 122 may examine the various configuration information 132 sets, assign a score to the information included therein (e.g., 1 point for each node, 2 points for a relationship value, 0.5 points for each host system resource node, etc.) and based on the score select the master configuration information set 132. It is understood that the above are merely a few illustrative examples to which the disclosed subject matter is not limited.

In various embodiments, the blueprint device 102 may include a graph normalizer 124. In some embodiments, the canonical application graphs 134 made available by the configuration importer 122 may be complicated. In such an embodiment, a desire may exist for the canonical application graphs 134 to be simplified for further processing. In various embodiments, the graph normalizer 124 may be configured to modify the canonical application graphs 134 to yield simplified, normalized application instance (NAI) graphs 136. In one embodiment, the graph normalizer 124 may be configured to generate the NAI graphs 136 be employing one or more of the following actions.

In one embodiment, the graph normalizer 124 may be configured to find node equivalences via a process that makes use of a domain or equivalence model 142. In some embodiments, the domain or equivalence model 142 may have been created or entered into the blueprint device 102 by an administrator or other user of the blueprint device 102 (not shown) that is knowledgeable of the relationship between a number of software and hardware components. In another embodiment, the domain or equivalence model 142 may have been created via a machine learning algorithm or other dynamic process. It is understood that the above are merely a few illustrative examples to which the disclosed subject matter is not limited.

Figure 5A:
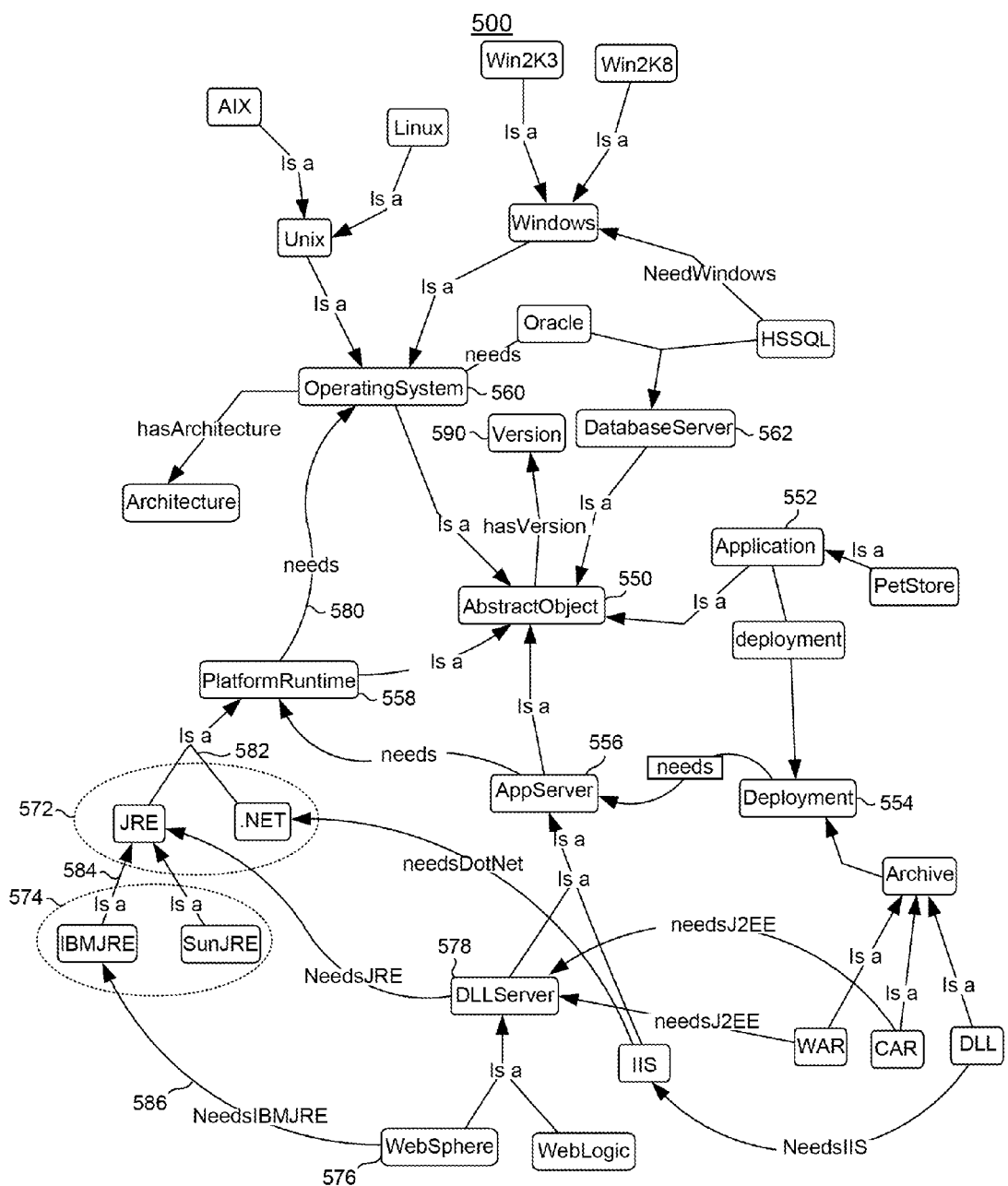
FIG. 5a is a block diagram of an example embodiment of a model in accordance with the disclosed subject matter.

FIG. 5a is a block diagram of an example embodiment of a domain model 500 in accordance with the disclosed subject matter. In one embodiment, the domain model (DM) 500 may take the form of a graph. It is understood that the above is merely one illustrative example to which the disclosed subject matter is not limited.

In the illustrated embodiment, the domain model 500 may include a base object or node 550 (called in this embodiment "AbstractDCObject") to which all other nodes or objects are related. In the illustrated embodiment, the DM 500 may include a number of broad category or sub-class objects or nodes (e.g., nodes 552, 554, 556, 558, 560, and 562) which are derived from the base object 550 and summarize in broad terms various categories of software and hardware in to manageable groups.

In one embodiment, a category node 552 may include an Application category that represents applications or network service like PetStore. An application node 552 may include or have one or more deployments, represented by category node 554. The Deployment node 554 may be configured to represent deployable artifacts or software components, such as packages or archives (e.g. Web Archive (WAR), Enterprise Archive (EAR), Dynamically Linked Libraries (DLL) etc.) which are deployed into application servers to instantiate an application's modules. In the illustrated embodiment, Deployment sub-classes may be Archive and then WAR, EAR, and DLL.

In one embodiment, a category node 556 may include an AppServer or application server category that represents an application server where the deployable packages are deployed to instantiate application modules. In the illustrated embodiment, J2EEServer and IIS represent two sub-classes of AppServer node 556 and further down the hierarchy WebLogic and WebSphere may be sub-classes of J2EEServer. It is understood that the above are merely a few illustrative examples to which the disclosed subject matter is not limited.

In one embodiment, a category node 558 may include a Platform Runtime category that represents an execution runtime environment (e.g., a Java Virtual Machine (JVM), etc.) for programs like those included by AppServer node 556 to execute in. As described below, in the illustrated embodiment, JRE and .NET may be sub-classes of Platform Runtime and further IBMJRE and SunJRE may be sub-classes of JRE. It is understood that the above are merely a few illustrative examples to which the disclosed subject matter is not limited.

In one embodiment, a category node 560 may include an Operating System category that represents the operating system via which the platform runtime 558 executes. In the illustrated embodiment, Unix and Windows may be sub-classes of the Operating System node 560 and further AIX and Linux may be sub-classes of Unix. It is understood that the above are merely a few illustrative examples to which the disclosed subject matter is not limited.

In one embodiment, a category node 562 may include a Database Server System category that represents database Oracle or MSSQL which in turn needs an operating system 560. It is understood that the above are merely a few illustrative examples to which the disclosed subject matter is not limited.

In various embodiments, the domain model 500 may be arranged in a hierarchal fashion, wherein various nodes are considered to be related to or further sub-categories another node. In the illustrated embodiment, the Platform Runtime node 558 includes the sub-categories or nodes JRE and .Net 272. This "is a" relationship is illustrated by links 582. Likewise, the JRE node may include the sub-categories or nodes 574 (IBMJRE and SunJRE) and that relationship is illustrated by link 584.

Further relationships between the nodes may exist. For example, link 586 indicates that the WebSphere node 576 (which is a sub-category of the JREEServer node 578) "needs" the node IBMJREE in order to properly function. In such an embodiment, the grouping and dependencies various software and hardware components may be represented.

In various embodiments, additional information or metadata may be associated with a node. For example, in the illustrated embodiment, the AbstractDCObject 550 may include metadata 590 that shows which version or versions of the AbstractDCObject 550 the DM 500 pertains. In another embodiment, the relationship links may include their own metadata. For example, the WebSphere node 576 versions 5-6.1 may "need" for an 64-bit OS to be present, whereas the WebSphere node 576 version 4 may "need" either a 32-bit or 64-bit OS. It is understood that the above is merely one illustrative example to which the disclosed subject matter is not limited.

Returning to FIG. 1, the graph normalizer 124 may be configured to examine the nodes of a canonical graph 134 and replace one or more of the nodes with category nodes (e.g., a JRE node, a Platform Runtime node, etc.) in order to simplify the graph. For example, two applications servers like WebSphere and WebLogic may be considered equivalent for the purposes of normalizing the graph and be replaced by the parent concept of an application server. In another embodiment, the DM 142 may be used to fill-in or create additional dependencies, relationships, or nodes missing from the canonical graphs 134.

Further, in one embodiment, graph normalizer 124 may be configured to take into consideration user specifications. In such an embodiment, the user 190 may have provided the blueprint device 102 with one or more specifications or equivalence rules as part of the request for blueprints (via the request message 172 or part of the interaction illustrated by arrow 164).

In various embodiments, the user 190 may have specified one or more equivalence rules that indicate that two or more pieces of software or hardware are effectively equivalent to the user 190 or the user 190 simply does not care. For example a user 190 may indicate that IIS server and Apache HTTP Server are equivalent for purposes of this blueprint search. In such an embodiment, the graph normalizer 124 may be configured to replace such instances in the canonical graphs 134 with a higher level or generic component (e.g. a web server, etc.). It is understood that the above is merely one illustrative example to which the disclosed subject matter is not limited.

In another embodiment, the graph normalizer 124 may be configured to prune or remove from consideration canonical graphs 134 that do not meet the user 190's requirements. For example, if alternately the user 190 only wanted blueprints 176 that make use of the IIS web server, canonical graphs 134 that make use of the Apache HTTP server may be ignored. It is understood that the above is merely one illustrative example to which the disclosed subject matter is not limited.

In some embodiments, the graph normalizer 124 may be configured to apply default user specifications. In some embodiments, the user 190 may be able to override these defaults. For ex ample, the graph normalizer 124 may be configured to remove immaterial nodes (like a caching server) or attributes (e.g., port values, network names, etc.) from the canonical graphs 134 as the nodes may not be considered important to the NAI graphs 136 or may be considered something that varies for each actual deployment of a particular blueprint 176. It is understood that the above are merely a few illustrative examples to which the disclosed subject matter is not limited.

Further, in one embodiment, the graph normalizer 124 may be configured to strip, remove, or categorize host or resource information. For example, in one embodiment, the graph normalizer 124 may group a plurality of processor variations into a single processor family (e.g., x86-64, etc.). Alternately, the graph normalizer 124 may information such as RAM levels or storage requirements, etc. It is understood that the above are merely a few illustrative examples to which the disclosed subject matter is not limited.

In one embodiment, if it was not previously done, the graph normalizer 124 may be configured to mask, strip, or categorize irrelevant attributes or metadata from various nodes or relationship links. For example, port information, network names or addresses, etc. may be masked for better matching between canonical graphs 134. It is understood that the above are merely a few illustrative examples to which the disclosed subject matter is not limited.

In one embodiment, the graph normalizer 124 may be configured to prune or remove links or nodes from the NAI graphs 136 in order to simplify the final NAI graphs 136. In one embodiment, this may be done based, at least in part, upon usage data. As described above, in various embodiments, the monitoring tool 182 may collect usage or other statistical data that may be included in the configuration information 184. In such an embodiment, the graph normalizer 124 may be configured to make use of this data in determining if various nodes or relationship links actually provide substantial value to a NAI graph 136 or if their inclusion would result in an increased number of variations with little practical difference.

FIG. 5b is a block diagram of an example embodiment of a NAI graph 501 in accordance with the disclosed subject matter. In the illustrated embodiment, a NAI graph 501 is shown for the specific example of the PetStore application or network service. It is understood that the above is merely one illustrative example to which the disclosed subject matter is not limited.

In one embodiment, the NAI graph 501 may include the Application node 502 and the Functional Component nodes 504. The NAI graph 501 may also include the Software nodes 508 and the relationship links 512.

In the illustrated embodiment, one will note that the NAI graph 501 has removed the software server nodes 406, host nodes 410, and at least some of the attributes 414 that were found in the canonical graph 400 of FIG. 4. In various embodiments, some of the attributes may be included in a NAI graph like graph 501 of FIG. 5b. Further, it may be seen that the port information or metadata was removed from the relationship links 514a and 514b. It is understood that the above are merely a few illustrative examples to which the disclosed subject matter is not limited.

Returning to FIG. 1, the blueprint device 102 may include a sub-graph identifier (IDer) 126. In various embodiments, the sub-graph IDer 136 may be configured to identify portions or sub-graphs of the NAI graphs 136 that are substantially similar (as defined by a pre-defined variance value) between one or more NAI graphs 136.

In one embodiment, the sub-graph IDer 126 may be configured to transform the NAI graphs 136 by labeling the edges and the vertices of the graphs. This identification may, in one embodiment, be in preparation for the identification of sub-graphs. In some embodiments, the labeling process for the edges and the vertices in the graph may label the edges/vertices using a set of predefined rules. For example, in various embodiments, the label for a vertex or edge may be assigned the label "type:Name" followed by a digest of other information contained therein (e.g., the property information that may be included in the digest of a vertex corresponding to an application server like version, type etc.). It is understood that the above is merely one illustrative example to which the disclosed subject matter is not limited.

In various embodiments, the relationship between the label and to the original pre-labeled graph may also maintained for later correlation of the identified potential blueprints 139 to the data contained in the detail NAI graphs 136.

In some embodiments, a machine learning technique (e.g., an Apriori algorithm, etc.) may be employed to learn the association between various nodes and the association amongst multiple NAI graphs 136. In various other embodiments, other graph mining techniques may be employed.

In one specific embodiment, the Apriori technique may be used to identify the most frequently occurring sets of items (nodes and relationships) in the input data set of item set transactions. In such an embodiment, the determination of "most frequent" may be based, at least in part, upon the frequency being greater than a specified minimum support level. The technique may employ the strategy of iteratively finding frequent item sets of cardinality 1 to k. The candidate item sets of cardinality k may be generated by self-joining frequent item sets of size k–1. The frequent item sets of cardinality k may be then generated from the candidate item sets of cardinality k making sure that the support level and the Apriori property is met. It is understood that the above is merely one illustrative example to which the disclosed subject matter is not limited.

In some embodiments, a frequent sub-graph discovery technique similar to Apriori may be used. In some such embodiments, the technique may include: enumerating all single and double-edged sub-graphs, and, until there are no more sub-graphs of sufficient (as pre-defined) size are found, generating candidate sub-groups of the pre-defined size, counting the frequency of each candidate sub-graphs, and pruning the candidate sub-graphs which do not satisfy a set of support constraints. It is understood that the above are merely a few illustrative examples to which the disclosed subject matter is not limited.

As a result of the sub-graph discovery technique employed by the sub-graph IDer 126, a number of frequently common sub-graphs 138 may be identified from the NAI graphs 136. These sub-graphs 136 may be candidates for potential partial and near complete blueprints. In various embodiments, the sub-graph IDer 126 may yield potential popular partial blueprints by identifying popular stack combinations like the software stacks that are prevalent in the organization and should be included in the blueprint library 127, and popular functional components and their topologies that are prevalent in the organizations represented in the configuration DB 120. These sub-graphs 136 may be provided to the blueprint generator 128.

FIG. 6 is a block diagram of an example embodiment of a number of graphs 602, 604, 606, and 608 in accordance with the disclosed subject matter. In various embodiments, these graphs may have been generated from a plurality of NAI graphs.

In some embodiments, the NAI graphs may be analyzed to identify various vertices and edges that represent application functional components, software servers, deployed software stack elements, etc. and the relations/connections between them. For example in graph 602 node F may represent a software say PetStore deployed on software server g e.g. Tomcat or a web server. It is understood that the above is merely one illustrative example to which the disclosed subject matter is not limited. In various embodiments, the nodes A, B, C, E, F, G, R, X, Y, P, and Z may represent similar portions of a NAI graph.

In the illustrated embodiment, the nodes A, B, C may be identified as comprising a sub-graph 612 in all four graphs 602, 604, 606, and 608. Further, the nodes X and Y may comprise sub-group 614 is the threshold for such consideration is set low enough that appearing only in the two graphs 604 and 608 is sufficient.

Conversely the nodes E, F, and G (highlighted by box 642) only appear in in graph 602 and are not considered a sub-graph. Likewise, with nodes R, P, and Z of graphs 604, 606, and 608, respectively. Further, the second node C (numbered node 650) of graph 606 is not considered part of the sub-graph 612 as it is only connected or in a relationship with node P, and not nodes A and B. It is understood that the above are merely a few illustrative examples to which the disclosed subject matter is not limited.

As described above, in various embodiments, these sub-graphs 612 and 614 may be provided to the next stage of the blueprint device in order to assemble or generate a candidate blueprint.

Returning to FIG. 1, in various embodiments, the blueprint device 102 may include a blueprint generator 128. In some embodiments, the blueprint generator 128 may be configured to generate one or more candidate blueprints 139. In various embodiments, the blueprint generator 128 may be configured to do this based, at least in part, upon the NAI graphs 136 and the identified sub-graphs 138.

In one such embodiment, the blueprint generator 128 may be configured to map the identified sub-graphs 138 to potential partial application blueprints using the relationships between the sub-graphs 138 and the NAI graphs 136. In various embodiments, the blueprint generator 128 may be configured to store or generate these blueprints 139 in a pre-defined format (e.g., CLM blueprint format, etc.). The resulting blueprints 139 may represent a set of popular functional blueprints 139 that may be included in a blueprint library, repository, or database 127.

As described above, in various embodiments, the user 190 may access a blueprint catalog 129 (included by the blueprint device 102) in search of one or more blueprints or templates that may be used to provision the network service device 106b. In one embodiment, the blueprint catalog 129 may include a web service or web site. In such an embodiment, the blueprint catalog 129 may search the blue library 127 a select one or more blueprints 176 that may or are expected to meet the user 190's requirements.

As described above. in some embodiments, the user 190 may indicate one or more equivalents or other search constraints or releases that may cause the blueprint device to generate additional blueprints 139 (e.g., via the graph normalizer 124, etc.). In various embodiments, these new blueprints 139 may be cached or stored within or by the blueprint library 127. In such an embodiment, upon receiving the new user 190's indicated equivalences, the blueprint catalog may determine if blueprints generated using the same equivalences (for a prior user's search) are already stored within the blueprint library 127.

FIG. 7 is a flow chart of an example embodiment of a technique 700 in accordance with the disclosed subject matter. In various embodiments, the technique 700 may be used or produced by the systems such as those of FIG. 1. Furthermore, portions of technique 700 may be use or produce the graphs such as those of FIG. 2a, 2b, 3a, 3b, 4, 5a, 5b, or 6. Although, it is understood that the above are merely a few illustrative examples to which the disclosed subject matter is not limited. It is understood that the disclosed subject matter is not limited to the ordering of or number of actions illustrated by technique 700.

Block 702 illustrates that, in one embodiment, an apparatus may collect a plurality of configuration information sets, as described above. as described above. In various embodiments, the configuration information sets may each be associated with or be in regards to a respective network service application. In various embodiments, one or more of the action(s) illustrated by this Block may be performed by the apparatus or system of FIG. 1, the database device 108 or the configuration importer 122 of FIG. 1, as described above.

Block 704 illustrates that, in one embodiment, a request, for at least one blueprint file may be received, as described above. As described above, each blueprint file may represent a template of a configuration of a network service application, as described above. In various embodiments, one or more of the action(s) illustrated by this Block may be performed by the apparatus or system of FIG. 1, the blueprint device 102 or the blueprint catalog 129 of FIG. 1, as described above.

Block 706 illustrates that, in one embodiment, a set of equivalence rules may be received that includes one or more software components that the user considers to be functionally equivalent, as described above. In various embodiments, one or more of the action(s) illustrated by this Block may be performed by the apparatus or system of FIG. 1, the blueprint device 102 or the blueprint catalog 129 of FIG. 1, as described above.

Block 708 illustrates that, in one embodiment, the plurality of configuration information sets may be converted into one or more normalized application instance graphs, as described above. In one embodiment, converting may include mapping the plurality of configuration information sets into at least one canonical application graph, as described above. In some embodiments, mapping may include reconciling multiple configuration information sets regarding the same network service into a single canonical application graph, as described above.

In some embodiments, each configuration information set includes a first number of nodes representing either software or hardware components associated with a respective network service application, as described above. And, in various embodiments, each normalized application instance graphs includes a second number of nodes representing either software or hardware components associated with the respective network service application, as described above. In such an embodiment, number of nodes in each configuration information set may be greater than or equal to the number of nodes in the normalized application instance graph, as described above. In such an embodiment, converting may include removing nodes from the configuration information set based upon a set of pre-defined criteria, as described above. In some embodiments, removing may include removing nodes that are of a hardware node type, as described above.

In various embodiments, converting may include receiving a set of user specified equivalence rules, and modifying the canonical application graph based, at least in part, upon the user specified equivalence rules, as described above. In some embodiments, converting may include normalizing a configuration information set by converting a node included by the configuration information set into an equivalent node included by a normalized application instance graph, as described above. In such an embodiment, the equivalence between the node included by the configuration information set and the node may be included by the normalized application instance graph is specified by a domain model, as described above. In various embodiments, one or more of the action(s) illustrated by this Block may be performed by the apparatus or system of FIG. 1, the blueprint device 102, the configuration importer 122, the graph normalizer 124, or the blueprint catalog 129 of FIG. 1, as described above.

Block 710 illustrates that, in one embodiment, one or more application blueprint files may be generated based, at least in part, upon the one or more normalized application instance graphs, as described above. In various embodiments, generating may include identifying at least one sub-graph that is sufficiently common, based on a pre-defined criteria, to a number of the normalized application instance graphs, and generating the one or more application blueprint files based, at least in part, upon the identified sub-graphs, as described above. In various embodiments, one or more of the action(s) illustrated by this Block may be performed by the apparatus or system of FIG. 1, the blueprint device 102, the sub-graph identifier 126, the blueprint generator 128, or the blueprint catalog 129 of FIG. 1, as described above.

Block 712 illustrates that, in one embodiment, at least one blueprint file may be provided to a user, wherein the blueprint file was generated based, at least in part, upon the one or more normalized application instance graphs, as described above. In various embodiments, one or more of the action(s) illustrated by this Block may be performed by the apparatus or system of FIG. 1, the blueprint device 102, the blueprint generator 128, the blueprint library 127, or the blueprint catalog 129 of FIG. 1, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
    collecting, by an apparatus, a plurality of configuration information sets regarding a plurality of network service applications;
    converting, by the apparatus, the plurality of configuration information sets into a number of normalized application instance graphs;
    identifying, by the apparatus, at least one sub-graph that is sufficiently common, based on a pre-defined criteria, to the number of the normalized application instance graphs; and
    generating, by the apparatus, one or more application blueprint files based, at least in part, upon the number of normalized application instance graphs including the at least one identified sub-graph.

2. The method of claim 1, wherein converting the plurality of configuration information sets into the number of normalized application instance graphs includes:
    mapping the plurality of configuration information sets into at least one canonical application graph.

3. The method of claim 2, wherein mapping the plurality of configuration information sets into at least one canonical application graph includes:
    reconciling multiple configuration information sets regarding the same network service into a single canonical application graph.

4. The method of claim 1, wherein converting the plurality of configuration information sets into the number of normalized application instance graphs includes:
    receiving a set of user specified equivalence rules; and
    modifying the canonical application graph based, at least in part, upon the user specified equivalence rules.

5. The method of claim 1, wherein converting the plurality of configuration information sets into the number of normalized application instance graphs includes:
    normalizing a configuration information set by converting a node included by the configuration information set into an equivalent node included by a normalized application instance graph,
    wherein the equivalence between the node included by the configuration information set and the node included by the normalized application instance graph is specified by a domain model.

6. The method of claim 1, wherein each configuration information set includes a first number of nodes representing either software or hardware components associated with a respective network service application;
    wherein each normalized application instance graphs includes a second number of nodes representing either software or hardware components associated with the respective network service application;
    wherein the first number is greater than the second number; and
    wherein converting the plurality of configuration information sets into a number of normalized application instance graphs includes: removing nodes from each configuration information set based upon the set of pre-defined criteria.

7. A method comprising:
    collecting, by an apparatus, a plurality of configuration information sets regarding a plurality of network service applications;
    converting, by the apparatus, the plurality of configuration information sets into one or more normalized application instance graphs; and
    generating, by the apparatus, one or more application blueprint files based, at least in part, upon the one or more normalized application instance graphs,
    wherein each configuration information set includes a first number of nodes representing either software or hardware components associated with a respective network service application,
    wherein each normalized application instance graph includes a second number of nodes representing either software or hardware components associated with the respective network service application,
    wherein the first number is greater than the second number,
    wherein converting a configuration information set into a normalized application instance graph includes removing nodes from the configuration information set based upon a set of pre-defined criteria, wherein each node of the configuration information set includes a node type, and wherein removing nodes from the configuration information set based upon a set of pre-defined criteria includes removing nodes that are of a hardware node type.

8. The method of claim 1, further comprising:

receiving a request, from a user of a second apparatus, for at least one blueprint file, wherein each blueprint file represents a template of a configuration of a network service application;

receiving a set of equivalence rules, from the user, that includes one or more software components that the user considers to be functionally equivalent; and providing, to the user, at least one blueprint file that was generated based, at least in part, upon the one or more normalized application instance graphs.

9. An apparatus comprising:

a memory configured to store a plurality of configuration information sets regarding a plurality of network service applications; and a processor configured to:

convert the plurality of configuration information sets into a number of normalized application instance graphs, identify at least one sub-graph that is sufficiently common, based on a pre-defined criteria, to the number of the normalized application instance graphs, and generate one or more application blueprint files based, at least in part, upon the number of normalized application instance graphs including the at least one identified sub-graph.

10. The apparatus of claim 9, wherein the processor is configured to map the plurality of configuration information sets into at least one canonical application graph.

11. The apparatus of claim 10, wherein the processor is configured to reconcile multiple configuration information sets regarding the same network service into a single canonical application graph.

12. The apparatus of claim 9, further including a network communications port configured to receive a set of user specified equivalence rules; and wherein the processor is configured to modify the canonical application graph based, at least in part, upon the user specified equivalence rules.

13. The apparatus of claim 9, wherein the processor is configured to:

normalize a configuration information set by converting a node included by the configuration information set into an equivalent node included by a normalized application instance graph, wherein the equivalence between the node included by the configuration information set and the node included by the normalized application instance graph is specified by a domain model.

14. The apparatus of claim 9, wherein each configuration information set includes a first number of nodes representing either software or hardware components associated with a respective network service application;

wherein each normalized application instance graphs includes a second number of nodes representing either software or hardware components associated with the respective network service application;

wherein the first number is greater than the second number; and wherein the processor is configured to remove nodes from each configuration information set based upon the set of pre-defined criteria.

15. An apparatus comprising:

a memory configured to store a plurality of configuration information sets regarding a plurality of network service applications; and a processor configured to:

convert the plurality of configuration information sets into one or more normalized application instance graphs, and generate one or more application blueprint files based, at least in part, upon the one or more normalized application instance graphs, wherein each configuration information set includes a first number of nodes representing either software or hardware components associated with a respective network service application, wherein each normalized application instance graphs includes a second number of nodes representing either software or hardware components associated with the respective network service application, wherein the first number is greater than the second number, wherein the processor is configured to remove nodes from the configuration information set based upon a set of pre-defined criteria, wherein each node of the configuration information set includes a node type, and wherein the processor is configured to remove nodes that are of a hardware node type.

16. The apparatus of claim 9, further including a network communications port configured to:

receive a request, from a user of a second apparatus, for at least one blueprint file, wherein each blueprint file represents a template of a configuration of a network service application;

receive a set of equivalence rules, from the user, that includes one or more software components that the user considers to be functionally equivalent; and provide, to the user, at least one blueprint file that was generated based, at least in part, upon the the number of normalized application instance graphs.

17. A computer program product for semi-automatically generating a blueprint file, the computer program product being tangibly and non-transitorily embodied on a computer-readable medium and including executable code that, when executed, is configured to cause a data processing apparatus to:

collect a plurality of configuration information sets regarding a plurality of network service applications;

convert the plurality of configuration information sets into a number of normalized application instance graphs;

identify at least one sub-graph that is sufficiently common, based on a pre-defined criteria, to the number of the normalized application instance graphs; and generate one or more application blueprint files based, at least in part, upon the number of normalized application instance graphs including the at least one identified sub-graph.

18. The computer-readable medium of claim 17, wherein the executable code is configured to, when executed, cause the apparatus to:

receive a request, from a user of a second apparatus, for at least one blueprint file, wherein each blueprint file represents a template of a configuration of a network service application;

receive a set of equivalence rules, from the user, that includes one or more software components that the user considers to be functionally equivalent; and provide, to the user, at least one blueprint file that was generated based, at least in part, upon the the number of normalized application instance graphs.

\* \* \* \* \*